US009612331B2

(12) United States Patent
Kwiatkowski et al.

(10) Patent No.: US 9,612,331 B2
(45) Date of Patent: Apr. 4, 2017

(54) LASER TRACKER WITH FUNCTIONALITY FOR GRAPHICAL TARGET PREPARATION

(71) Applicant: LEICA GEOSYSTEMS AG, Heerbrugg (CH)

(72) Inventors: Tomasz Kwiatkowski, Moosleerau (CH); Burkhard Böckem, Rieden (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 368 days.

(21) Appl. No.: 14/372,717

(22) PCT Filed: Jan. 16, 2013

(86) PCT No.: PCT/EP2013/050762
§ 371 (c)(1),
(2) Date: Jul. 16, 2014

(87) PCT Pub. No.: WO2013/107781
PCT Pub. Date: Jul. 25, 2013

(65) Prior Publication Data
US 2015/0009493 A1 Jan. 8, 2015

(30) Foreign Application Priority Data

Jan. 17, 2012 (EP) ..................... 12151438

(51) Int. Cl.
G01B 11/26 (2006.01)
G01S 17/42 (2006.01)
(Continued)

(52) U.S. Cl.
CPC ................ *G01S 17/42* (2013.01); *G01S 7/51* (2013.01); *G01S 17/66* (2013.01)

(58) Field of Classification Search
CPC ............. G01S 17/42; G01S 17/66; G01S 7/51
(Continued)

(56) References Cited

U.S. PATENT DOCUMENTS 7,081,917 B2   7/2006   Shimoyama et al.
7,098,997 B2   8/2006   Shirai et al.
(Continued)

FOREIGN PATENT DOCUMENTS

EP   2 219 011 A      8/2010
JP   H4-178514 A      6/1992
(Continued)

OTHER PUBLICATIONS

European Search Report dated Apr. 23, 2012 as received in Application No. EP 12 15 1438.
(Continued)

*Primary Examiner* — Mark Hellner
(74) *Attorney, Agent, or Firm* — Maschoff Brennan

(57) ABSTRACT

Some embodiments include a laser tracker having: a base defining a standing axis; a beam steering unit for emitting a measurement radiation; a distance measuring unit for determining the distance to the target; and angle measurement functionality for determining an alignment of the beam steering unit. The beam steering unit can swivel around the standing axis and a tilt axis relative to the base. A measurement axis is defined by an emission direction of the measurement radiation. The laser tracker may include a target-seeking unit having lighting means and at least one target-seeking camera having a position-sensitive detector. The one target-seeking field can be illuminated by means of the lighting means. A search image for the position dependent identification of the target can be detected with the target-seeking camera and at least part of the lighting beam reflected on the target can be determined as a search image position.

20 Claims, 7 Drawing Sheets

(51) Int. Cl.
*G01S 17/66* (2006.01)
*G01S 7/51* (2006.01)

(58) Field of Classification Search
USPC .................................................. 356/139.06
See application file for complete search history.

(56) References Cited

U.S. PATENT DOCUMENTS

| | | | |
|---|---|---|---|
| 8,225,514 | B2 | 7/2012 | Guip et al. |
| 8,681,317 | B2 * | 3/2014 | Moser ............... G01S 17/66 356/3.01 |
| 2004/0246498 | A1 | 12/2004 | Kumagai et al. |
| 2006/0158423 | A1 * | 7/2006 | Kern ................. G01C 1/04 345/156 |
| 2006/0244944 | A1 * | 11/2006 | Waibel ............. G01C 15/002 356/5.02 |
| 2012/0014564 | A1 * | 1/2012 | Jensen ............... G01C 1/04 382/106 |
| 2012/0105821 | A1 * | 5/2012 | Moser ............... G01S 17/66 356/3.09 |
| 2014/0320643 | A1 | 10/2014 | Markendorf |

FOREIGN PATENT DOCUMENTS

| | | |
|---|---|---|
| JP | 2003-130644 A | 5/2003 |
| JP | 2004-37127 A | 2/2004 |
| JP | 2004-85551 A | 3/2004 |
| WO | 92/07233 A1 | 4/1992 |
| WO | 2004/036145 A1 | 4/2004 |
| WO | 2007/079600 A1 | 7/2007 |
| WO | 2010/047146 A1 | 4/2010 |
| WO | 2010/057169 A2 | 5/2010 |
| WO | 2010/148525 A1 | 12/2010 |
| WO | 2010/148526 A1 | 12/2010 |

OTHER PUBLICATIONS

Hern'an Badino et al., "Integrating LIDAR into Stereo for Fast and Improved Disparity Computation" 3D imaging, Modeling, Processing, Visualization and Transmission, 2011 International Conference on, IEEE May 16, 2011.

* cited by examiner

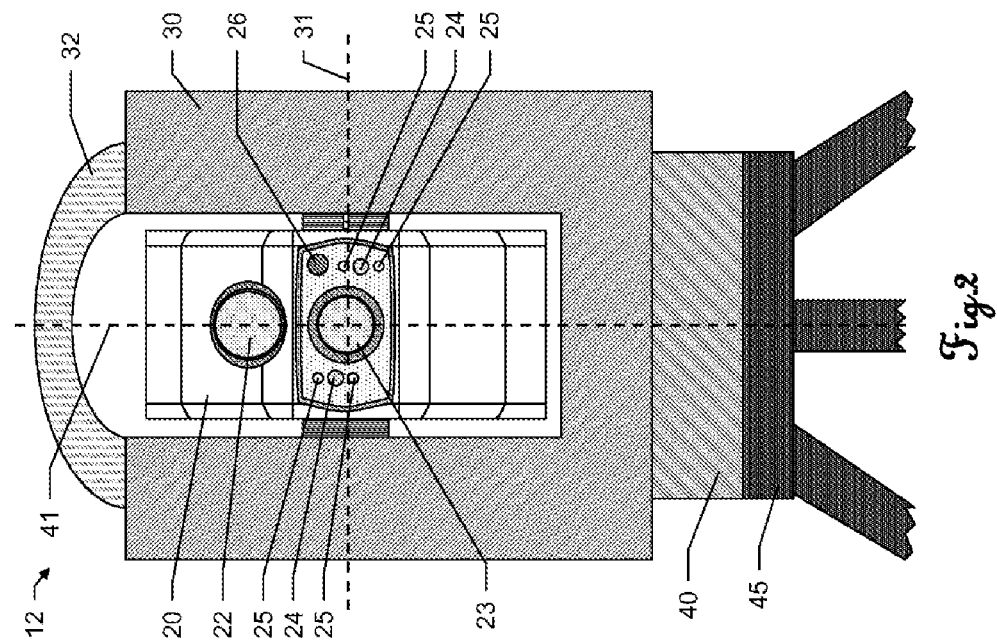
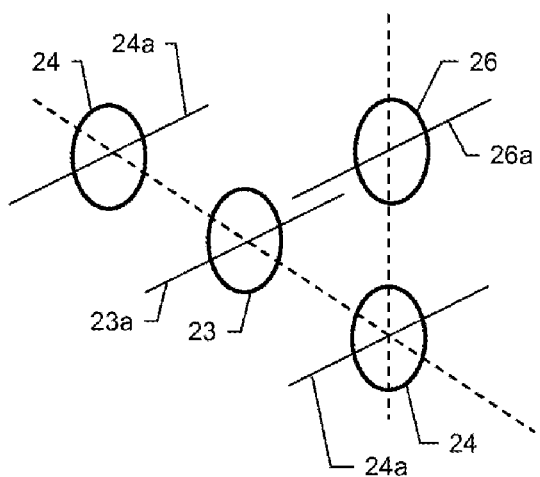
Fig.2
Fig.3a

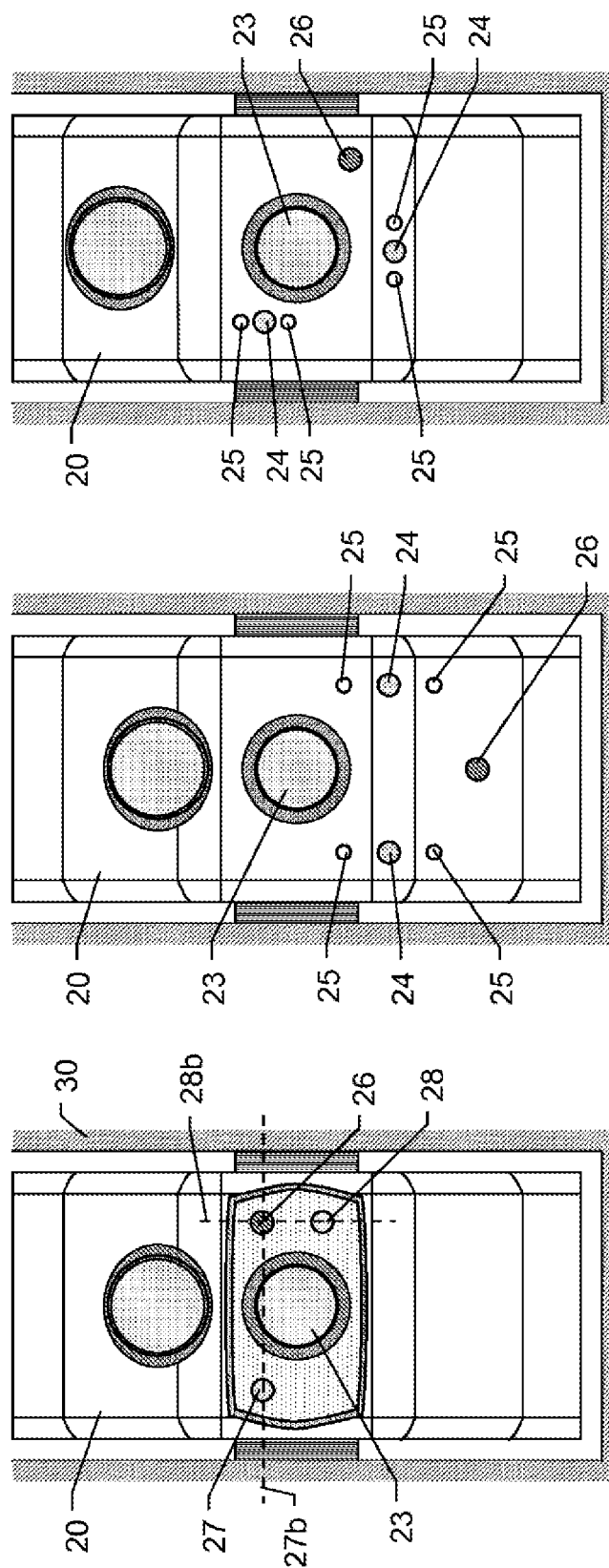

LASER TRACKER WITH FUNCTIONALITY FOR GRAPHICAL TARGET PREPARATION

FIELD OF THE INVENTION

The invention relates to a laser tracker for progressively tracking a reflective target and for determining the position of the target, a system made of laser tracker and control unit, and a target provision method.

BACKGROUND

Measuring devices which are implemented for progressively tracking a target point and determining the coordinate position of this point can be summarized in general, in particular in conjunction with industrial surveying, under the term laser tracker. A target point can be represented in this case by a retroreflective unit (for example, cube prism), which is targeted using an optical measuring beam of the measuring device, in particular a laser beam. The laser beam is reflected in parallel back to the measuring device, wherein the reflected beam is acquired using an acquisition unit of the device. An emission or reception direction of the beam is ascertained in this case, for example, by means of sensors for angle measurement, which are associated with a deflection mirror or a targeting unit of the system. In addition, a distance from the measuring device to the target point is ascertained with the acquisition of the beam, for example, by means of runtime or phase difference measurement.

Laser trackers according to the prior art can additionally be embodied having an optical image acquisition unit having a two-dimensional, light-sensitive array, for example, a CCD or CID camera or a camera based on a CMOS array, or having a pixel array sensor and having an image processing unit. The laser tracker and the camera can be installed one on top of another in this case in particular in such a manner that the positions thereof relative to one another are not variable. The camera is, for example, rotatable together with the laser tracker about its essentially perpendicular axis, but pivotable up-and-down independently of the laser tracker and therefore arranged separately from the optic of the laser beam in particular. Furthermore, the camera—for example, as a function of the respective application—can be embodied as pivotable about only one axis. In alternative embodiments, the camera can be installed in an integrated construction together with the laser optic in a shared housing.

With the acquisition and analysis of an image—by means of image acquisition and image processing unit—of a so-called measuring aid instrument having markings, the relative location of which to one another is known, an orientation of an object (for example, a probe), which is arranged on the measuring aid instrument, in space can be concluded. Together with the specific spatial position of the target point, furthermore the position and orientation of the object in space can be precisely determined absolutely and/or relative to the laser tracker.

Such measuring aid instruments can be embodied by so-called scanning tools, which are positioned having the contact point thereof on a point of the target object. The scanning tool has markings, for example, light spots, and a reflector, which represents a target point on the scanning tool and can be targeted using the laser beam of the tracker, wherein the positions of the markings and of the reflector relative to the contact point of the scanning tool are precisely known. The measuring aid instrument can also be, in a way known to a person skilled in the art, a handheld scanner equipped for distance measurement, for example, for contactless surface surveying, wherein the direction and position of the scanner measuring beam used for the distance measurement are precisely known relative to the light spots and reflectors which are arranged on the scanner. Such a scanner is described, for example, in EP 0 553 266.

For distance measurement, laser trackers of the prior art have at least one distance meter, wherein it can be implemented, for example, as an interferometer. Since such distance measuring units can only measure relative distance changes, so-called absolute distance meters are installed in modern laser trackers in addition to interferometers. For example, such a combination of measuring means for distance determination is known by way of the product AT 901 of Leica Geosystems AG. The interferometers used in this context for the distance measurement primarily use HeNe gas lasers—because of the long coherence length and the measuring range thus made possible—as light sources. The coherence length of the HeNe laser can be several hundred meters in this case, so that using relatively simple interferometer constructions, the ranges required in industrial measuring technology can be achieved. A combination of an absolute distance meter and an interferometer for distance determination having an HeNe laser is known, for example, from WO 2007/079600 A1.

In addition, in modern tracker systems, a deviation of the received measuring beam from a zero position is ascertained on a sensor—increasingly as a standard feature. By means of this measurable deviation, a position difference between the center of a retroreflector and the point of incidence of the laser beam on the reflector can be determined and the alignment of the laser beam can be corrected or tracked as a function of this deviation such that the deviation on the sensor is decreased, in particular is "zero", and therefore the beam is aligned in the direction of the reflector center. By way of the tracking of the laser beam alignment, progressive target tracking (tracking) of the target point can be performed and the distance and position of the target point can be progressively determined relative to the measuring device. The tracking can be implemented in this case by means of an alignment change of the deflection mirror, which is movable by a motor, provided for deflecting the laser beam and/or by a pivot of the targeting unit, which has the beam-guiding laser optic.

The described target tracking must be preceded by locking of the laser beam on the reflector. For this purpose, an acquisition unit having a position-sensitive sensor and having a comparatively large field of vision can additionally be arranged on the tracker. In addition, in devices of this type, additional illumination means are integrated, using which the target or the reflector is illuminated, in particular using a defined wavelength differing from the wavelength of the distance measuring means. The sensor can be implemented in this context as sensitive to a range around this specific wavelength, for example, to reduce or entirely prevent external light influences. By means of the illumination means, the target can be illuminated and, using the camera, an image of the target having illuminated reflector can be acquired. By way of the imaging of the specific (wavelength-specific) reflection on the sensor, the reflection position in the image can be resolved and therefore an angle relative to the acquisition direction of the camera and a direction to the target or reflector can be determined. An embodiment of a laser tracker having such a target search unit is known, for example, from WO 2010/148525 A1. As a function of the direction information thus derivable, the alignment of the measuring laser beam can be changed such that a distance between the laser beam and the reflector onto which the laser beam is to be locked is decreased.

One disadvantage of this locking-on operation is that, upon acquisition of the illumination radiation reflected on targets, more than one reflection from multiple different targets, which are in the range of vision of the position-sensitive sensor, is acquired and due to the ambiguity thus arising, it is not possible to reliably lock onto a desired target. It can be linked to substantial effort for a user of the measuring system in this case to align the laser beam on this desired target. For example, the coordinates of the detected reflections must be compared in this case to the possible targets and the target must be identified by the user as a function of this comparison. Such a procedure can prove to be very time-consuming depending on the number of the acquired reflections and the targets located in a measuring environment, and therefore can greatly increase the effort for initializing a measuring operation. In particular, such target locating and locking on requires qualified proficiency and experience of the user and contains in this case—especially as a function of the user qualification—substantial error sources, whereby, for example, not the desired target, but rather a further target, which is of similar design and is located close to the desired target, can be targeted and this confusion will not be noticed by the user as a result of the similarities.

SUMMARY

Some embodiments of the present invention may provide for an improved laser tracker, which allows the tracking and position determination of a target, wherein identifying, and in particular targeting, of a desired target can be performed more simply and rapidly.

Some embodiments of the present invention may provide for a laser tracker having a functionality, by means of which a desired target can be selected and targeted from a set of targets, or a sequence can be established for the successive surveying of multiple targets in a user-friendly manner.

The invention relates to a laser tracker for progressively tracking a reflective object and for determining the position of the object having a base defining a standing axis and a beam deflection unit for emitting measuring radiation and for receiving at least a part of the measuring radiation reflected on the object, wherein the beam deflection unit is pivotable by a motor about the standing axis and an inclination axis relative to the base and a measuring axis is defined by an emission direction of the measuring radiation. In addition, a distance measuring unit for precisely determining the distance to the object by means of the measuring radiation, an angle measuring functionality for determining an alignment of the beam deflection unit relative to the base, and a target search unit are provided on the laser tracker. The target search unit has illumination means for generating electromagnetic illumination radiation and at least one target search camera having a position-sensitive detector, wherein the target search camera defines a target search field of vision, the target search field of vision can be illuminated by means of the illumination means, using the target search camera, a search image can be acquired for the position-dependent identification of the target and positions of illumination radiation reflections, which are acquired in the search image and represent respective reflective targets, can be identified and can be determined as search image positions in the search image. Furthermore, the tracker has an overview camera, wherein an overview field of vision of the overview camera overlaps with the target search field of vision and, using the overview camera, an overview image, which at least partially reproduces the visual spectral range, can be acquired, in particular for the display for a user, in particular a color image. The target search camera and the overview camera are arranged in known position and alignment relationship relative to one another and additionally a processing unit is provided.

According to the invention, the laser tracker has a target provision functionality such that, upon execution of the target provision functionality by the processing unit, graphic markings are incorporated into the overview image by means of image processing as a function of the search image positions, so that the markings represent the targets in the overview image.

Using such a laser tracker according to the invention, the targets found using the target search camera can therefore be incorporated into the overview image such that the positions of the targets are represented by markings which are superimposed on the overview image or by markings which are embedded in the overview image. The markings can be incorporated in this case in the form of symbols, for example, as crosses or circles indicating target points, or designations, for example, numbers indicating the coordinates of a point position or distances. Thus, a target display (by means of graphic markings) performed in the meaning of the target provision functionality is performed by a position-faithful transfer of the search image positions into the overview image. The search image which can be acquired using laser trackers typically reproduces only points or positions at which the illumination reflections are imaged on the position-sensitive detector of the target search camera, but no spectral information. By the transfer of the search image positions into the overview image, an image representing the visual spectral range can be generated, wherein in addition positions of the targets are recorded in the environment acquired in the image. Thus, for example, a more user-friendly overview of a measuring environment having the targets located therein can be provided to a user of the laser tracker. In general, the overview image can be spectrally acquired and displayed in this case such that a visual range which can be acquired by humans without technical aids can be at least partially reproduced by the overview image.

In principle, in the scope of the invention, the incorporation of the markings into the overview image is understood, on the one hand, as an incorporation of the markings in the form of a graphic overlay of the overview image with the markings, for example, by using multiple image planes (image layers) lying one on top of another, wherein these can be partially transparent. In addition, the markings can be introduced into the overview image by a change of the original overview image, for example, by a pixel-by-pixel modification of the image information, so that the markings can be considered to be "burned into" the overview image and thus a modified overview image is generated. In addition, a graphic representation of the search image positions together with the overview image is understood in general as an incorporation of the markings.

According to the invention, the target provision functionality can therefore provide a position-faithful transfer of the search image positions into the overview image, wherein the identified targets can be displayed in a position-faithful manner in the overview image by means of the graphic markings.

With respect to the incorporation and the display of the markings, according to the invention, as a function of the illumination radiation reflections acquired in the search image, a shape and in particular a spatial extension of the targets can be determined and the markings can be displayed in the overview image as a function of the shape and in particular the spatial extension.

The markings can be displayed on a display screen together with the overview image such that, on the one hand, the position of the respective marking in the overview image indicates a position of the target, which is represented by the marking, in the environment acquired in the image and, on the other hand, the design of the marking provides an item of information about the embodiment of the target. For example, one form of the marking can indicate a specific target type, for example, prism, and the size of the displayed marking can indicate a reflection capability or a spatial extension of the target.

One aspect of the invention additionally relates to the embodiment of the target search camera and the overview camera and the respective relative arrangement thereof to one another. In this context, the target search camera and the overview camera can have defined focal lengths, in particular wherein the focal lengths of both cameras are identical, in particular constant. Using such a focal length correspondence, a combination of the markings with the overview image can be performed, in that the search image positions are incorporated or overlaid corresponding to their position in the search image at respective positions in the overview image. In particular, the target provision can be performed in this case by means of the search image positions of only one target search camera.

In particular, the target search camera can be arranged according to the invention such that the optical axis thereof is arranged offset, in particular offset in parallel, to the optical axis of the overview camera. In general, the optical axis of the target search camera can be arranged at a defined angle relative to the optical axis of the overview camera. Depending on the arrangement of the cameras to one another, the incorporation of the markings can be carried out in consideration of the respective positioning and alignment. Thus, for example, a precision increase can be achieved with respect to the positioning of the markings in the overview image.

Furthermore, the target search camera can be arranged according to the invention having the optical axis thereof offset to the measuring axis, in particular wherein the relative offset of the optical axis of the target search camera to the measuring axis is known.

In addition, the illumination radiation can have a defined illumination wavelength range, in particular infrared radiation, and the target search camera can be implemented to acquire electromagnetic radiation in a range, in particular a narrowband range, around the defined illumination wavelength range. Using such a combination of specific illumination means and target search camera, for example, external light influences, which can corrupt the acquired measured values, can be decreased or prevented and therefore the system can be constructed as more robust in relationship to environmental influences. Thus, for example, infrared radiation can be emitted by the illumination means and primarily light in the infrared range (absorption peak in the infrared range having a narrowband detection range around a central absorption wavelength) can be acquired using the target search camera, wherein light from the visual spectrum is not detected.

Furthermore, the laser tracker or the target search unit according to the invention can have one further or multiple further target search cameras having respectively a position-sensitive detector and respectively a target search field of vision, in particular wherein the one further or multiple further target search cameras are implemented to acquire electromagnetic radiation in the range around the illumination wavelength range. Additional items of information with respect to the acquired targets can be generated with the use of one further or multiple further target search cameras. Thus, for example, coarse distances or coarse positions of the targets can be determined and can be considered upon the combination of the markings with the overview image for positioning the markings in the image.

In one special embodiment of the invention, the target search cameras can respectively be arranged with known and fixed position and alignment relationship relative to one another and relative to the overview camera such that the target search fields of vision of the target search cameras overlap, in particular overlap in a shared range of vision with the overview field of vision, and the optical axes thereof are respectively arranged offset to the measuring axis.

In particular, according to the invention—in the event of an arrangement of two or more target search cameras on the laser tracker—using the target search cameras, respectively a search image having search image positions can be acquired and respective search image positions representing a shared target can be grouped such that coarse distances to the targets can be determined as a function of the grouped search image positions, in particular spatial coarse positions of the targets.

Thus, if a target is detected using the position-sensitive detectors of multiple target search cameras and respectively a search image position is determined for the target, thus, as a function of these search image positions and optionally as a function of the alignment and position relationship of the cameras, respectively an acquisition direction to the target can be determined. A position and/or (coarse) distance to the target can then be derived from these directions, wherein geometrical principles (for example, the law of sines) or known methods of stereophotogrammetry can be used for this purpose. The incorporation of the markings into the overview image can be performed as a result in consideration of the respective target distances or target positions determined for the targets (and additionally as a function of the known axial offset of the optical axis of the overview camera from the measuring axis or the optical axes of the target search cameras).

Furthermore, according to the invention, the coarse distances can be linked to respective items of image information of the overview image such that an at least partially perspective environmental image can be generated. Therefore, if respective coarse distances are determined for a number of targets from at least two acquired search images and the items of distance information are associated with the corresponding targets acquired in the overview image, the acquired overview image can be changed by means of these items of information additionally available such that the image can be displayed at least partially in perspective. The pixels or image regions in the overview image, which correspond with respect to position to the search image positions acquired in the search image, can be displayed plastically based on the derived items of distance information. A quasi-three-dimensional environmental image can thus be generated. For example, therefore perspective image profiles can be modeled as a function of the items of distance information to individual targets, in particular between two adjacent targets.

According to the invention, in this context, in the scope of the target provision functionality, as a function of the search image positions, which have been determined using the target search cameras, the graphic markings can therefore be incorporated into the overview image or into the at least partially perspective environmental image, in particular wherein the markings are incorporated as a function of the coarse distances, in particular as a function of the coarse positions.

In the scope of the invention, the laser tracker can have one further or multiple further overview cameras for acquiring one further or multiple further overview images which at least partially reproduce the visual spectral range, wherein a perspective overview image can be generated from the overview image and the one further or the multiple further overview images, and the target provision functionality is configured such that upon execution of the target provision functionality, the graphic markings are incorporated into the perspective overview image.

By way of the (simultaneous) acquisition of multiple images of a shared target environment from different positions, which is possible using at least two overview cameras, a perspective overview image can be generated from these acquired images, in which the target environment is shown in perspective (three-dimensionally). This perspective image can be generated in particular using photogrammetric algorithms and by means of image processing. For this purpose, the overview cameras can be arranged in a respective known position and alignment relationship relative to one another. The search image positions detected by the target search unit can be incorporated as markings in the perspective overview image, so that the targets can also be represented by the markings in such a perspective image. Especially, coarse items of distance information to objects in the target environment can additionally be derived on the basis of these multiple overview images (stereophotogrammetry).

The overview image is to be understood, on the one hand, as an image of an environment—corresponding to the target search field of vision—acquired using the overview camera. Alternatively thereto, the overview image can be embodied by an acquired image modified by means of image processing, wherein the item of image information originally acquired using the overview camera is changed. For example, in this context, an additional item of image information can be added to the acquired overview image. In this case, for example, image elements can be incorporated into the image, for example, based on a digital model (CAD model).

In the scope of such an image modification, for example, contours of digitally constructed objects can be "fitted" into the acquired image as a function of the detected search image positions, so that an image is generated which has both objects acquired by means of the overview camera and also, for example, CAD objects or object parts of a CAD model. In the event of an overlay of such CAD objects with the acquired image, extractable edges of the image can additionally be used. Therefore, for example, an acquired two-dimensional image can be combined with a three-dimensional CAD design, so that, for example, a graphic comparison of (coarse) target positions acquired by means of the target search unit with setpoint CAD data can be performed.

With respect to possible structural embodiments of the laser tracker according to the invention, the laser tracker can have a support, which is pivotable by a motor about the standing axis relative to the base and defines the inclination axis or a horizontal or recumbent axis, and a targeting unit, which is implemented as a beam deflection unit and is pivotable by a motor about the inclination axis relative to the support, wherein the targeting unit has a telescope unit for emitting the measuring radiation and for receiving at least a part of the measuring radiation reflected on the target. In such an embodiment, an alignment of the measuring axis can be performed by means of an alignment of the targeting unit and the target search camera and the overview camera (OVC) can be arranged on the targeting unit.

A further aspect of the invention relates to a system made of a laser tracker according to the invention and a control unit for controlling the laser tracker, wherein the control unit has a display unit for the graphic display of the overview image and the markings.

Furthermore, the system according to the invention can have a selection function, wherein in the scope of the selection function, a desired marking is selectable from the markings incorporated into the overview image by means of the display unit, in particular by a user. Especially, according to the invention, a measuring sequence of the targets represented by the markings can be definable by means of the selection function, in particular wherein the targets can be targeted and surveyed in the measuring sequence successively by an alignment of the measuring radiation on the targets.

By means of such a system made of laser tracker and control unit, in particular user-friendly operation of the laser tracker can be provided and monitoring of a measuring process can be performed or acquisition of measurement data can be tracked on the user side. Especially, the control unit can be implemented as a computer unit having control and analysis software, wherein the overview image can be displayed alone or together with the markings on a monitor connected to the computer. An algorithm can be provided in this case, by means of which the selection function is provided and wherein a user can select a desired target by clicking an indicated marking, for example. This selected target can then be automatically targeted using the measuring radiation by an alignment of the measuring axis such that it intersects the target, for determining the position of the selected target. In the scope of the selection operation, the user can furthermore establish a sequence, in which the targets represented by the markings are to be targeted and surveyed. The establishment of this measuring sequence can also be performed by successive clicking of markings.

A further aspect of the invention relates to a target provision method for incorporating graphic markings into an overview image using a laser tracker. The laser tracker has a base defining a standing axis, a beam deflection unit for emitting measuring radiation and for receiving at least a part of the measuring radiation reflected on an object, wherein the beam deflection unit is pivotable by a motor about the standing axis and an inclination axis relative to the base, a distance measuring unit for precisely determining the distance by means of the measuring radiation, and an angle measuring functionality for determining an alignment of the beam deflection unit relative to the base.

In the scope of the target provision method, an illumination of a target search field of vision using electromagnetic illumination radiation and an acquisition of a search image for the position-dependent identification of targets are performed, wherein illumination radiation reflections, which represent positions of reflective targets, are identified as search image positions in the search image and the target search field of vision is defined. In addition, an acquisition of the overview image, which at least partially reproduces the visual spectral range, is performed, wherein an overview field of vision is defined, in particular for the display for a user, in particular a color image. The overview field of vision overlaps in this case with the target search field of vision and a recording of the search image and a recording of the overview image of respectively known position and in known alignment relationship are performed.

According to the invention, the graphic markings are incorporated into the overview image by means of image processing as a function of the search image positions, so that the markings represent the targets in the overview image.

In addition, in the scope of the target provision method according to the invention, at least one further acquisition of a search image having further search image positions of at least one further known position and in known alignment relationship can be performed, respective search image positions representing a shared target can be grouped and coarse distances to the targets can be determined as a function of the grouped search image positions, in particular spatial coarse positions of the targets, and in the scope of the target provision method, the markings can be incorporated into the overview image as a function of the search image positions, and/or can be incorporated as a function of the coarse distances, in particular as a function of the coarse positions.

Furthermore, the invention relates to a computer program product, which is stored on a machine-readable carrier, for controlling the illumination of the target search field of vision, the acquisition of the search image, and the acquisition of the overview image of the target provision method according to the invention. In addition, the computer program product is implemented for executing the incorporation of the graphic markings into the overview image as a function of the search image positions by means of image processing of the target provision method according to the invention, in particular when the computer program product is executed on a processing unit of a laser tracker according to the invention.

BRIEF DESCRIPTION OF THE DRAWINGS

The method according to the invention and the device according to the invention will be described in greater detail hereafter solely as examples on the basis of concrete exemplary embodiments, which are schematically illustrated in the drawings, wherein further advantages of the invention will also be discussed. Specifically:

FIG. 2 shows a further embodiment of a laser tracker according to the invention having two target search cameras and an overview camera;

FIGS. 3a-c each show an arrangement of target search cameras and an overview camera on a laser tracker according to the invention;

FIGS. 4a-d each show an embodiment of a targeting unit of a laser tracker according to the invention having target search cameras and respectively an overview camera;

DETAILED DESCRIPTION

Figure 1:
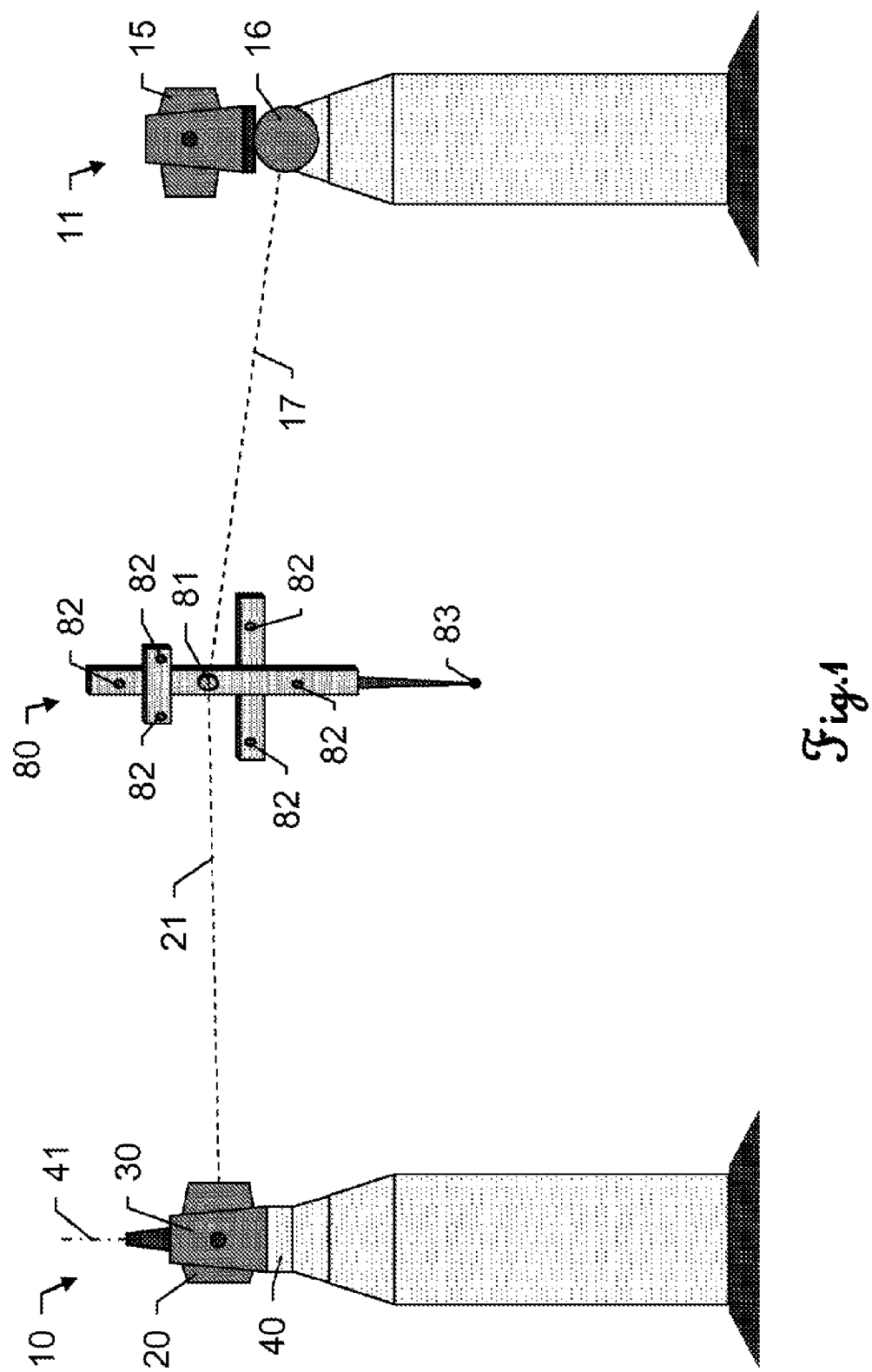
FIG. 1 shows two embodiments of a laser tracker according to the invention and a measuring aid instrument.

FIG. 1 shows two embodiments of laser trackers 10, 11 according to the invention and a measuring aid instrument 80, for example, a tactile measuring device. The first laser tracker 10 has a base 40 and a support 30, wherein the support 30 is arranged so it is pivotable or rotatable around a pivot axis 41, which is defined by the base 40, relative to the base 40. In addition, a targeting unit 20 is arranged on the support 30 such that the targeting unit 20 is pivotable relative to the support 30 about an inclination axis (transit axis). By way of an alignment capability of the targeting unit 20 thus provided about two axes, a laser beam 21 emitted by this unit 20 can be aligned and therefore targets can be targeted. The pivot axis 41 and the inclination axis are arranged essentially orthogonally to one another in this case, i.e., slight deviations from an exact axis orthogonality can be predetermined and stored in the system, for example, to compensate for measuring errors thus resulting.

In the arrangement shown, the laser beam 21 is oriented on a reflector 81 on the measuring aid instrument 80 and is retroreflected thereon back to the laser tracker 10. By means of this measuring laser beam 21, a distance to the reflector 81 can be determined, in particular by means of runtime measurement, by means of the phase measurement principle, or by means of the Fizeau principle. The laser tracker 10 has a fine distance measuring unit for determining this distance between the tracker 10 and the reflector 81 and angle meters, which make it possible to determine a position of the targeting unit 20, by means of which the laser beam 21 can be aligned and guided in a defined manner, and therefore a propagation direction of the laser beam 21.

In addition, the laser tracker 10, in particular the targeting unit 20, has an image acquisition unit for the purpose of determining a position of a sensor exposure on a sensor or in an acquired image of a CMOS or is implemented in particular as a CCD camera or pixel sensor array camera. Such sensors permit a position-sensitive detection of acquired exposure on the detector. Furthermore, the measuring aid instrument 80 has a tactile sensor, the contact point 83 of which can be brought into contact with a target object to be surveyed. While this contact exists between the scanning tool 80 and the target object, a position of the contact point 83 in space and therefore the coordinates of a point on the target object can be exactly determined. This determination is performed by means of a defined relative positioning of the contact point 83 to the reflector 81 and to orientation markings 82 arranged on the measuring aid instrument 80, which can be implemented as light-emitting diodes, for example. Alternatively, the orientation markings 82 can also be implemented such that they reflect the incident radiation in the event of illumination, for example, using radiation of a defined wavelength (orientation markings 82 implemented as retroreflectors), in particular display a specific lighting characteristic, or that they have a defined pattern or color coding. Therefore, an orientation of the scanning tool 80 can be determined from the location or distribution of the orientation markings 82 in an image acquired using the sensor of the image acquisition unit.

The second laser tracker 11 has a beam guiding unit 16 separate from the image acquisition unit 15 for emitting a second laser beam 17, which is also aligned on the reflector 81. Both the laser beam 17 and also the image acquisition unit 15 are respectively pivotable by a motor about two axes and can thus be aligned such that, by means of the image acquisition unit 15, the target 81 targeted using the laser beam 17 and the orientation markings 82 of the measuring aid instrument 80 can be acquired. Therefore, a precise distance to the reflector 81 and an orientation of the instrument 80 can also be determined here on the basis of the spatial location of the orientation markings 82.

For the respective alignment of the laser beams 17, 21 on the reflector 81, respective illumination means for illuminating the reflector 81 with radiation of a specific wavelength, in particular in the infrared wavelength range, are provided on the laser trackers 10, 11, and additionally at least one target search camera having a position-sensitive detector, a so-called ATR camera (automatic target recognition) is arranged on each tracker 10, 11. The illumination radiation which is reflected on the reflector 81 and radiated back to the laser tracker 10, 11 can respectively be detected by means of the camera and a position of the reflector 81 on the respective detector can be imaged using the position-sensitive detectors. Therefore, both using the first laser tracker 10 and also using the second laser tracker 11, an imaged position of the reflector can be determined and, as a function of these detected search image positions, the target (reflector 81) can be located in the image and the targeting unit 20 or the beam guiding unit 16 can be aligned such that the target is targeted using the measuring beam 17, 21 or the target 81 is approached using the laser beam 17, 21. The laser trackers 10, 11 can alternatively each have at least two cameras respectively having a position-sensitive detector for this purpose, wherein, for each tracker 10, 11, from the respective two acquired search image positions for the reflector 81, respectively a coarse position of the reflector 81 can be determined, for example, according to generally known principles of photogrammetry, for example. For a robust detection of the reflections, filters can be installed in the target search camera in particular (for example, wavelength-dependent filters), which, for example, only transmit the light emitted by the illumination means, and/or threshold values can be stored for a comparison of the acquired signals to signal setpoint values in the laser tracker.

In addition, the laser trackers 10, 11 according to the invention respectively have an overview camera, the field of vision of which—in comparison to the fields of vision of the target search cameras having position-sensitive detectors—is larger and therefore allows a larger range to be acquired. Using these overview cameras, images of objects and targets in the visual light spectrum can be acquired, wherein these images can be output by means of a display unit on the laser trackers and/or on a display screen, which is arranged on a respective control unit for controlling the respective laser tracker 10, 11. Color images can especially be acquired using the overview camera.

Furthermore, the ATR cameras (or the only respectively one camera, respectively) of a tracker 10, 11 are arranged according to the invention in a known positioning and alignment relative to the overview camera of the tracker 10, 11. By way of this known arrangement, in the scope of a target provision functionality, which can be executed using a processing unit of the laser tracker 10, 11, one or more search image positions, which are imaged in search images acquired using the position-sensitive detectors, can be overlaid with an overview image of the overview camera. For this purpose, in particular markings representing a respective target can be incorporated into the overview image. Using such an incorporation, the search image position acquired with respect to position in the ATR image can be linked to the overview image, so that the search image position is provided in a position-faithful manner in the overview image. For this purpose, the markings in the overview image are provided as a function of the search image position (and in particular as a function of the relative positioning of overview camera to the target search camera). By way of a position referencing thus provided, the overview image can now be displayed, wherein a marking is indicated in a position-faithful manner in the overview image for each target reflection acquired using the target search cameras, for example. The reflected measuring radiation acquired using the position-sensitive detectors can furthermore permit a judgment of a target, for example, with respect to a shape or a degree of reflection of the target. In consideration of this additional information, the targets can be displayed according to the features which can thus be determined in the image, wherein, for example, the size of the marking displayed in the overview image represents the reflectivity of the target.

In the scope of the incorporation of the markings into the overview image, for example, upon a use of two target search cameras per laser tracker 10, 11 for the search image position determination or coarse distance determination, a parallax problem which arises due to the offset of the cameras to one another, can be resolved, i.e., the (sometimes only minimally) differing acquisition angles of the cameras can be determined and considered during the incorporation of the markings. For example, if only one target search camera on the laser tracker is used for determining search image positions, simple, coarse projection of the search image positions and display thereof by markings can thus be performed.

The illumination means, the target search cameras, and/or the overview camera can be arranged in this context, for example, on the image acquisition unit 15, the beam guiding unit 16, the targeting unit 20, the support 30, and/or the base 40 in respectively defined positions.

By means of the knowledge of the positioning of the target search cameras (in the case of two target search cameras provided on a laser tracker) relative to an emission direction of the respective measuring laser beam 17, 21, the laser beam 17, 21 can be aligned on the ascertained coarse position of the reflector 81 and locked thereon (lock-on). Thus, in spite of a construction-related offset of the laser emission direction to the acquisition directions of the target search camera, a rapid alignment of the respective beam 17, 21 can be performed and a parallax provided by the optical axes of the cameras and the laser beam 17, 21 can be determined. The laser beam 17, 21 can especially be aligned on the target 81 directly, i.e., without an iterative intermediate step.

In particular—alternatively or additionally to the determination of a coarse position of the reflector 81 by means of the search image positions determined using two target search cameras in two search images—a coarse distance to the reflector 81 can be determined from the search image positions acquired and imaged on the detectors (on one of the laser trackers 10, 11). This determination can be performed by means of generally valid geometrical principles, for example, by means of the altitude theorem for triangles and/or by means of the law of sines and/or cosines.

In addition, such a provision according to the invention of markings (for the search image positions) using the image of the overview camera can also be applied in laser trackers without image acquisition unit 15 for determining the orientation (six-degrees-of-freedom camera) of a measuring aid instrument 80 (3-D laser trackers).

FIG. 2 shows a further embodiment of a laser tracker 12 according to the invention having a base 40, which is arranged on a tripod 45 and defines a pivot axis 41. In addition, a support 30, which defines an inclination axis 31 (tilt axis) and is pivotable about the pivot axis 41 relative to the base 40, having a handle 32 is arranged on the base. Furthermore, a targeting unit 20 is provided, wherein this targeting unit 20 is installed so it is pivotable about the inclination axis 31 relative to the support 30.

The targeting unit 20 furthermore has a vario-camera having a vario-camera objective 22 and an optic 23, which is associated with a distance measuring and tracking unit arranged in the targeting unit 20, wherein a measuring laser beam is emitted from the distance measuring and tracking unit by means of the optic 23 for precisely determining a distance to a target and for tracking the target. In addition, two target search cameras 24, each having a camera optic and each having a position-sensitive detector and additionally illumination means 25, which are implemented as LEDs, for example, and emit light in the infrared range in particular in operation, are provided on the targeting unit 20. Using these illumination means 25, a target, for example, a reflector, can therefore be illuminated or irradiated and at least a part of the radiation can be reflected back by the reflector in the direction of the laser tracker 12 or in the direction of the target search cameras 24. The reflected light is then acquired using the cameras 24, imaged by means of the camera optics on the respective position-sensitive detector, and the position of the imaging in a search image is identified as the respective first and second search image positions. For each of these search image positions, in consideration of the alignment of the detectors, respectively a direction to the target and therefore an offset relative to a zero position on the respective detector and/or a direction angle, in particular two direction angles for two detector axes, for example, for an X axis and a Y axis predefined by the dimensioning of the detector, can now be determined therefrom. By means of these positions of the target thus acquired, automated locating of the target can be performed. The locating of the target can be performed in this case in particular by means of stereophotogrammetry.

As a function of the direction angles determined by means of the two detectors, a coarse position of the target and/or a coarse distance to the target can then be coarsely determined on the basis of the known relative positioning of the target search cameras 24, for example, by means of a mathematical geometrical triangle construction.

The target search cameras 24 (having camera optics and detectors) are arranged in this case so that the fields of vision of the cameras 24 at least partially overlap (intersect) and the target (or multiple targets) can therefore be acquired in the fields of vision of both target search cameras 24, in particular can be acquired simultaneously using both cameras 24. In this case, the first camera can have a large field of vision, for example, wherein the second camera can have a field of vision which is comparatively smaller. Therefore, on the one hand, a larger range can be acquired (by means of the first camera) and simultaneously a high precision can be implemented in the search image position determination (by means of the second camera). Alternatively, both target search cameras 24 can have a large field of vision, so that the largest possible overlap range can be generated (with lower measuring precision), or both cameras 24 can be embodied having a narrow field of vision, so that an increased precision is achieved in the coarse position determination (with smaller overlap range and therefore smaller measuring range).

Furthermore, the laser tracker 12 has an overview camera 26, which is placed in a known position relationship to the two target search cameras 24. The field of vision of the overview camera 26 (overview field of vision) is implemented in this embodiment such that both fields of vision of the target search cameras 24 overlap with the overview field of vision in a shared range, so that a target which can be acquired using both target search cameras 24 can also be acquired using the overview camera 26, in particular simultaneously. The search image positions detected using one target search camera 24 can be compared and/or grouped with those target search positions detected using the second camera 24 such that those search image positions which were acquired using both cameras 24 for shared targets are respectively associated with one another and are processed further thereafter as search image positions for a shared target. In particular, a shared search image position for the shared target can be derived therefrom.

By way of the known positioning of the target search cameras 24 and the overview camera 26 on the targeting unit 20, in general as a function of the search image positions, an incorporation of graphic markings, which indicate the search image positions and therefore represent the targets, into the overview image can be performed. Especially, a transfer of the search image position determined by means of the target search cameras 25 into a coordinate system defined by the overview camera 26 can be performed. For this purpose, furthermore the position and alignment relationship of the cameras to one another can be considered. In particular, the incorporation of the search image position into the overview image can be performed as a function of the determined coarse distance to the target. The transfer or incorporation of the search image positions can be performed in this case, for example, by means of coordinate transformation, wherein the coordinates of the search image position established by the position-sensitive detector in a target search coordinate system are transformed as a function of a relative alignment and location of the target search coordinate system to an overview coordinate system of the overview camera 26 into coordinates of the overview coordinate system.

On the basis of such a graphic overlay of the search image positions with the overview image, an image of acquired objects and additionally targets, which are displayed in the image and recorded with respect to position at the correct point in the image—represented by markings dependent on the target type, for example—can be output. A "point-and-click" functionality can thus be provided, in the scope of which, by a selection of a desired target indicated in the image (from a set of targets), the measuring beam of the tracker 12 is aligned on this target, and wherein the beam can be locked onto the target and the target can be tracked. In particular, the target can be selected on a touch-sensitive display, on which the image is output, for example, by tapping a marking.

After the laser beam is aligned on a reflector (retroreflector), for example, by means of the "point-and-click" functionality and is reflected back thereby, a precise distance to the reflector can be determined by means of a fine distance measuring unit in the laser tracker 12 or in the targeting unit 20, respectively. Furthermore, the laser beam can then be locked onto the reflector and the reflector can be tracked using the beam. For this purpose, a position of the reflected measuring beam on the sensor and a deviation of the incident radiation with respect to a zero point position are determined on a further position sensor associated with the beam path of the measuring radiation. By means of this deviation, which can be determined on the sensor in two directions, a position change of the reflector can be detected and the laser beam can be tracked in accordance with this change and therefore the reflector can be progressively targeted.

In the embodiment shown, the target search cameras 24 and the overview camera 26 are arranged on the targeting unit 20 such that the acquisition directions thereof do not lie in a plane which is defined by the pivot axis 41 and the center point of the optic 23, or in a plane which is defined by the inclination axis 31 and the center point of the optic 23, however, at least one of the cameras can be arranged in one of the corresponding planes in an alternative embodiment.

The arrangement of this type of the cameras 24, 26 and the target provision according to the invention offer a simplification with respect to the device design, improved compactness of the system, higher precision for the target finding, better image quality of the overview image, and reduced energy consumption of the device. In addition, special IR filters (infrared filters) for optimum color reproduction can be used for the overview camera 26. Furthermore, the use of selective IR band filters for the target search cameras 24 offers increased robustness and reliability of the ATR system.

In a special embodiment of a laser tracker according to the invention, the reflected illumination light (illumination radiation reflections) can be detected using at least three target search cameras and therefore three search image positions on three position-sensitive detectors and corresponding direction angles can be determined. A determination of the coarse distance to a target then results as a function of the imaged three search image positions on the detectors.

Figure 3B:
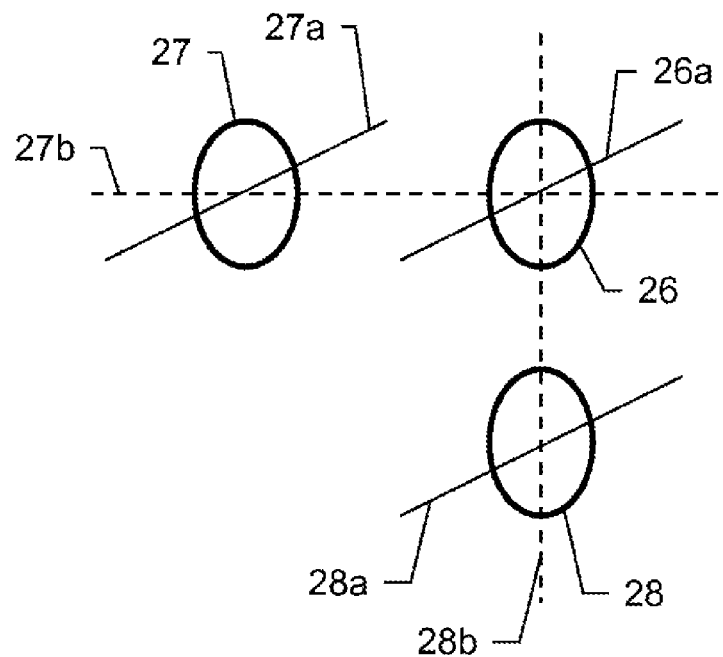

FIGS. 3a, 3b each show an embodiment of an arrangement of target search cameras 24 and an overview camera 26 on a laser tracker according to the invention. In FIG. 3a, two target search cameras 24 having respective optical axes 24a, an overview camera 26 having its optical axis 26a, and an objective 23 of a telescope unit having a measuring axis 23a are shown. The optical axes 24a, 26a are aligned parallel to one another in this case and arranged with a defined offset to the measuring axis 23a. The target search cameras 24 are furthermore placed on a shared connecting line through the measuring axis 23a, wherein the focal lengths of the two target search cameras 24 are identical.

Using the two target search cameras 24, reflective objects, for example, retroreflectors, can be identified by means of active illumination. In this case, the respective targets acquired individually using the individual cameras 24 can be grouped, so that search image positions, which are determined individually by means of both cameras 24, of a specific target are associated and linked with one another. Thereafter, a coarse distance to each of the acquired reflections can be determined, for example, by means of triangulation with respect to the two target search cameras 24. As a function of an item of position and distance information which can be derived therefrom, each identified reflective target or its position which can thus be determined with respect to the target search camera 24 can be transferred into an overview image of the overview camera 26. For this purpose, an offset of the target search cameras 24 to the overview camera 26 can be considered. Furthermore, the target, in particular an approximate shape and/or spatial extension of the target, can now be projected into a visual image, which is acquired using the overview camera, at the transferred position (in the overview image), wherein the target is specified by a marking in the overview image. In particular, the target thus displayed can be periodically indicated in the overview image, so that the target appears to be flashing in the image.

FIG. 3b shows an alternative arrangement of two target search cameras 27, 28 (ATR cameras) and an overview camera 26 and the optical axes 26a, 27a, 28a thereof. The cameras 26, 27, 28 have identical focal lengths in this case. In addition, the target search camera 27 is arranged on a plane together with the overview camera 26 such that the cameras 26, 27 have a shared X axis 27b, wherein this X axis 27b respectively intersects the optical axis 27a of the target search camera 27 and the optical axis 26a of the overview camera 26. Furthermore, the target search camera 28 is arranged on a plane together with the overview camera 26 such that the cameras 26, 28 have a shared Y axis 28b, wherein the Y axis 28b respectively intersects the optical axis 28a of the target search camera 28 and the optical axis 26a of the overview camera 26. The X axis 27b and the Y axis 28b are orthogonal to one another in this case.

By way of such an arrangement, a search image, which is acquired using one of the target search cameras 27, 28, having detected search image positions of reflective targets, can be directly linked to an overview image of the overview camera 26, wherein the search image positions of the targets detected using the target search camera 27 can be projected as a function of the X axis 27b of the target search camera 27 and the search image positions of the targets detected using the target search camera 28 can be projected as a function of the Y axis 28b of the target search camera 28 into the overview image. In particular, both search image positions acquired using the target search camera 27 and also using the target search camera 28 and/or search image positions which are derived from a mutual consideration of the detected targets of both target search cameras 27, 28 can be incorporated in this manner into the overview image in the form of markings and displayed therein in a projection-faithful manner. Such a projection or overlay of the search image positions with the overview image can be performed without a preceding determination of a coarse distance to the target.

Figure 3C:
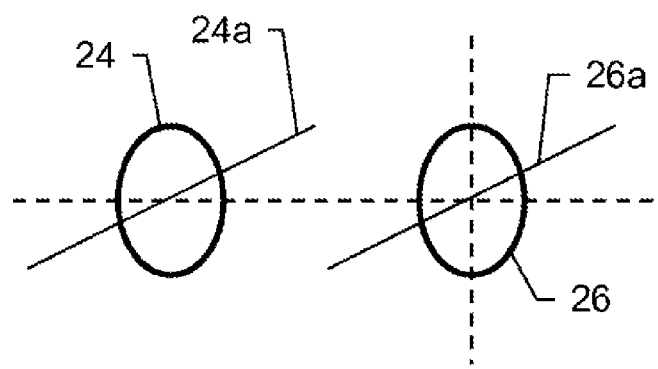

FIG. 3c shows a further embodiment for the arrangement of a target search camera 24 (ATR camera) and an overview camera 26 and the optical axes 24a, 26a thereof. The cameras 24, 26 again have identical focal lengths in this case. Using this arrangement, the search image positions, which are identified by means of the position-sensitive detector of the target search camera 24, in the overview image of the overview camera 26 can be indicated (by a projection) by markings. The markings in the overview image are displayed in this case as a function of the search image positions in the search image. A known position and alignment relationship between target search camera 24 and overview camera 26 can additionally be considered in this case.

FIGS. 4a-d each show an embodiment of a targeting unit 20 of a laser tracker according to the invention having target search cameras 24, 27, 28 and respectively an overview camera 26.

FIG. 4a shows an embodiment of a targeting unit 20, which is pivotable relative to a support 30 and has a telescope unit having a telescope objective 23. The target search cameras 27, 28 and the overview camera 26 are localized here according to the arrangement shown in FIG. 3b on the targeting unit 20, wherein the X axis 27b and the Y axis 28b respectively intersect the optical axis of the overview camera 26 and the respective optical axis of one of the target search cameras 27, 28. In this case, a display of an overview image having recognized targets can be performed on a display screen, for example, on a control unit for the laser tracker (after the search image positions acquired using the target search cameras 27, 28 have been transferred into the overview image) and a desired target can be selected. The target thus selectable can then be targeted by means of automatic pivoting of the targeting unit 20 relative to the support 30 and pivoting of the support 30 relative to a base, on which the support is arranged, using a measuring beam generated in the telescope unit. For this purpose, precise locating of the target can be performed by means of the two target search cameras 27, 28 having respective position-sensitive detector. Such target finding is described, for example, in European Patent Application Number 11192216.7.

FIG. 4b also shows two target search cameras 24, which are arranged offset underneath the optic 23, and four illumination means 25, which are used to illuminate the target. The illumination means 25 are respectively arranged symmetrically around the respective camera 24 here. By means of the illumination means 25, a reflector can be illuminated and the illumination beam reflections generated by the reflector can be acquired using the two target search cameras 24 such that the reflector is imaged on position-sensitive detectors of the target search cameras 24 and the position of this image is determined as a search image position in a search image which can be acquired using the detector. In addition, an overview image can be acquired using the overview camera 26, wherein the reflector is in the range of vision of the overview camera 26 and is therefore acquired on the overview image. The target search cameras 24 and the overview camera 26 are therefore arranged on the targeting unit such that their fields of vision overlap.

A coarse distance to the reflector can be determined by the search image positions thus detected for the reflector (respectively one search image position using a target search camera), in particular wherein the coarse distance can be determined according to generally known principles of photogrammetry. Additionally or alternatively, a coarse position of the reflector can be calculated in consideration of a direction to the target (i.e., an angle determination), which can be derived from a search image position.

As a function of the positioning of the cameras 24, 26 on the targeting unit 20 and as a function of the determined coarse distance or coarse position, the coordinates of the reflector which can be determined by the position-sensitive detectors can be incorporated into the overview image or overlaid thereon, wherein the coordinates can be provided in the overview image, in particular as graphic markings. Therefore, the position of the reflector detected using the target search cameras 24 is overlaid in the overview image and can be graphically output in the image together with a marking representing the reflector. The position of the marking in the image corresponds in this case to the position at which the reflector is actually located in the measuring environment acquired therein.

FIG. 4c shows a further embodiment according to the invention of the targeting unit 20 having two target search cameras 24, with which two illumination means 25 for illuminating a target are respectively associated. The camera-illumination means combinations are arranged asymmetrically around the telescope optic 23 in this case. A first of these combinations is arranged laterally to and the second is arranged underneath the telescope optic 23. In addition, an overview camera 26 is again arranged on the targeting unit 20 having a defined and known position and alignment relationship to the target search cameras 24. The optical axes of the cameras 24, 26 are each aligned slightly angled to one another in this case, but their respective fields of vision overlap in a shared range of vision. In an alternative embodiment, the optical axes can respectively be aligned parallel to one another.

Figure 4D:
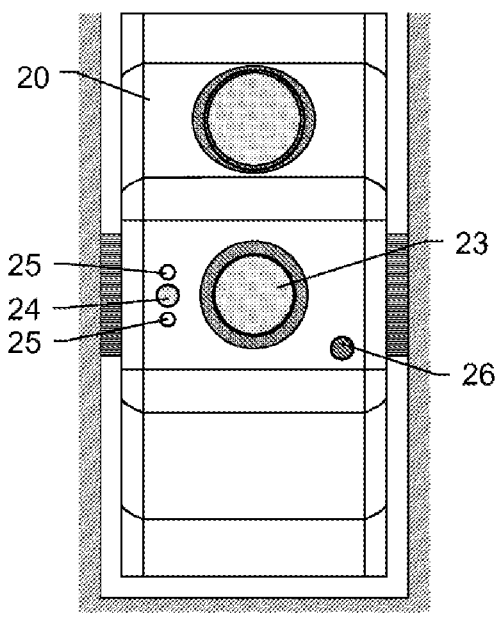

FIG. 4d shows a further embodiment according to the invention of the targeting unit 20 having a target search camera 24, with which two illumination means 25 for illuminating a target are associated, and an overview camera 26. The camera-illumination means combinations are arranged in this case adjacent to the telescope optic 23.

Figure 5:
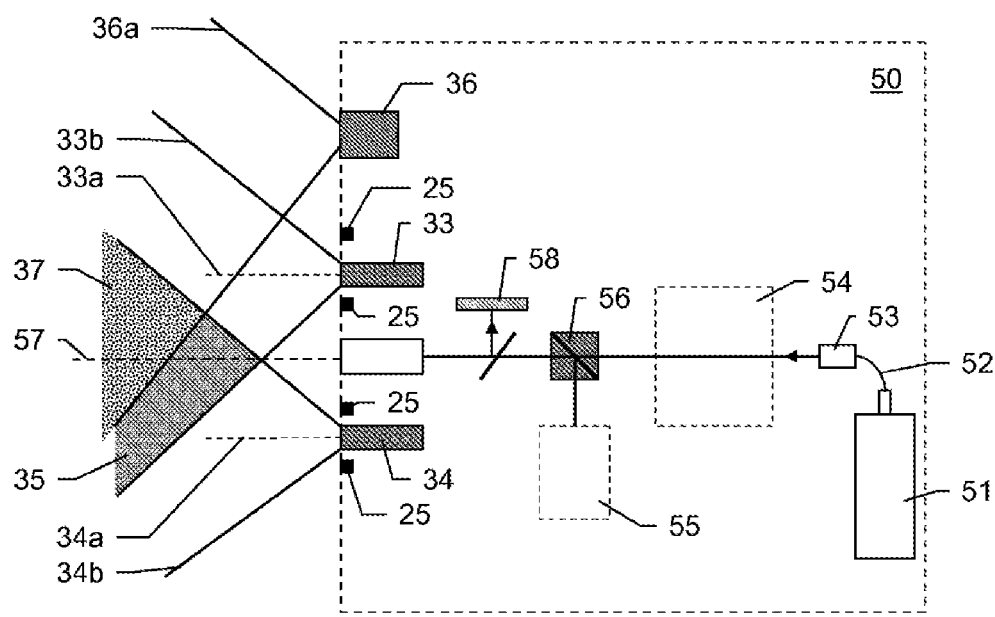
FIG. 5 shows an embodiment according to the invention of an optical structure of a laser tracker according to the invention.

FIG. 5 shows an embodiment of an optical structure of a laser tracker according to the invention. An optical unit 50 of the laser tracker has in this case a laser beam source 51—for example, an HeNe laser source or a laser diode—and a collimator 53 for coupling the laser radiation generated using the beam source 51 into the measuring beam path. The radiation is guided in the structure shown by means of an optical fiber 52 from the laser beam source 51 to the collimator 53, but can alternatively also be coupled directly or by optical deflection means into the measuring beam path. The optical unit 50 additionally has an interferometer unit 54, by means of which distance changes to the target can be detected and measured. The radiation generated using the beam source 51 is used as measuring radiation for the interferometer 54, split in the interferometer 54 into a reference path and measuring path, and detected on a detector, after reflection of the measuring beam on the target, together with the reference beam. In addition, an absolute distance measuring unit 55 having a further beam source and a further detector is provided. This unit 55 is used for determining the distance to the target, wherein the radiation generated thereby is guided by means of a beam splitter 56 together with the interferometer radiation onto a shared measuring beam path. The arrangement of the optical components and the guiding of the measuring radiation in the optical unit 50 define a measuring direction or an optical measuring axis 57. For precise determination of a distance to the target, measured values of both absolute distance meter 55 and interferometer 54 can be considered and in particular linked. In a special embodiment of a laser tracker, absolute distance meter 55 and interferometer 54 can define different measuring beam paths and/or can be arranged structurally separated, in particular in different measuring groups.

In addition, a position-sensitive detector 58 (tracking surface sensor, in particular PSD) is arranged in the optical unit 50 such that measuring laser radiation reflected on the target can be detected thereon. By means of this PSD 58, a deviation of the point of incidence of the acquired beam from a servo-control zero point can be determined and tracking of the laser beam on the target can be performed on the basis of the deviation. For this purpose and to achieve a high precision, the field of vision of this PSD 58 is selected to be comparatively small, i.e., corresponding to the beam diameter of the measuring laser beam. An acquisition using the PSD 58 is performed coaxially to the measuring axis 57, so that the acquisition direction of the PSD 58 corresponds to the measuring direction. The application of the PSD-based tracking and the fine targeting can first be performed after the measuring laser has been aligned on a retroreflective target (at least coarsely, i.e., such that the target lies within the measuring laser cone).

The optical unit 50 furthermore has two target search cameras 33, 34 (ATR cameras) having a respective optical axis 33a, 34a or acquisition direction and illumination means 25. Furthermore, each of the cameras 33, 34 defines a target search field of vision 33b, 34b, wherein the target search cameras 33, 34 are arranged such that the fields of vision 33b, 34b overlap and therefore an ATR overlap region 35 is established.

By means of the illumination means 25, electromagnetic radiation can be emitted to illuminate the target. If this radiation is reflected on the target and at least partially reflected in the direction of the two target search cameras 33, 34, the reflected illumination radiation (illumination radiation reflection) can be acquired using both target search cameras 33, 34 in respectively one search image as a search image position. By way of the arrangement of the target search cameras 33, 34 such that an ATR overlap region 35 is present, the target can be acquired in this region 35 using both target search cameras 33, 34 and a coarse distance to the target and/or a coarse position of the target can be determined.

Furthermore, an overview camera 36 having an overview field of vision 36a is provided on the optical unit 50. In this case, the overview camera 36 is arranged so that the overview field of vision 36a respectively overlaps with the target search fields of vision 33b, 34b and thus a shared overlap region 37 is defined. By way of the arrangement shown of the cameras 33, 34, 36 and the fields of vision 33b, 34b, 36a thereof, referencing according to the invention of the search image positions which can be acquired using the target search cameras 33, 34 can be performed in an overview image which can be acquired using the overview camera 36.

In a special embodiment (not shown here), according to the invention, the target search cameras 33, 34 can be arranged such that the optical axes 33a, 34a thereof are respectively arranged offset in parallel or at a defined angle relative to the measuring axis 57.

In a further special embodiment (not shown), an (angled) arrangement of the optical axes 33a, 34a relative to the measuring axis is implementable in such a manner that the optical axes 33a, 34a are respectively aligned glancing to one another or are aligned "glancing toward" or "glancing away from" the measuring axis 57, and therefore do not extend in parallel to the measuring axis 57. Such an arrangement can be provided, for example, for generating a relatively large overlap region of the fields of vision 33b, 34b or for generating the largest possible overall field of vision.

In a further special embodiment (also not shown), the target search cameras 33, 34 and the measuring axis 57 can be arranged such that at least one of the optical axes 33a, 34a of the target search cameras 33, 34 is arranged coaxially, i.e., not offset, to the measuring axis 57.

Figure 6A:
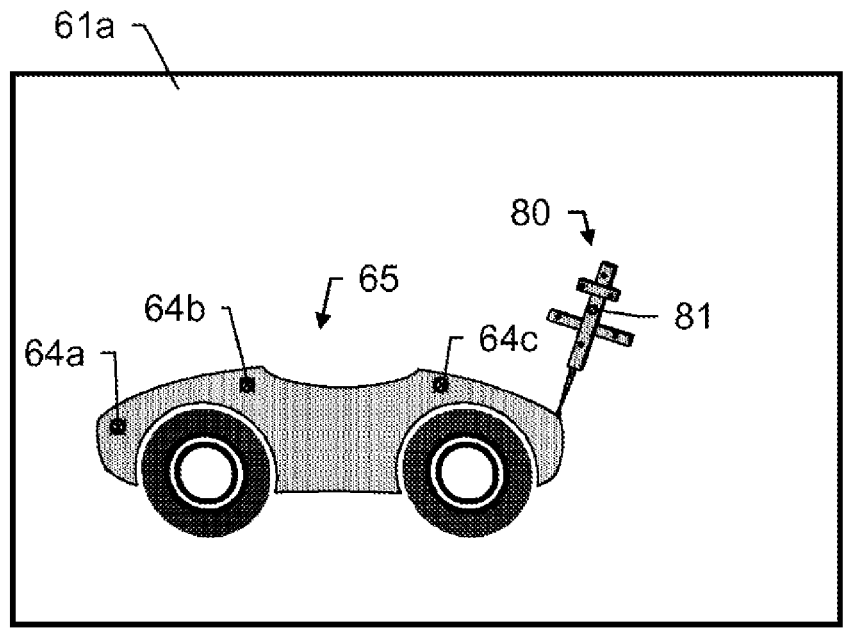
FIGS. 6a-c show overview images, having search image positions acquired by a target search camera, and a representation of the transferred search image positions into the overview image.
Figure 6B:
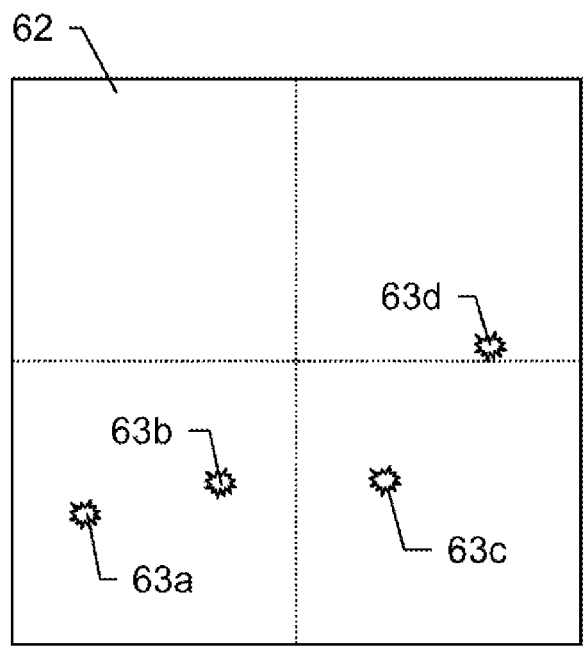
Figure 6E:
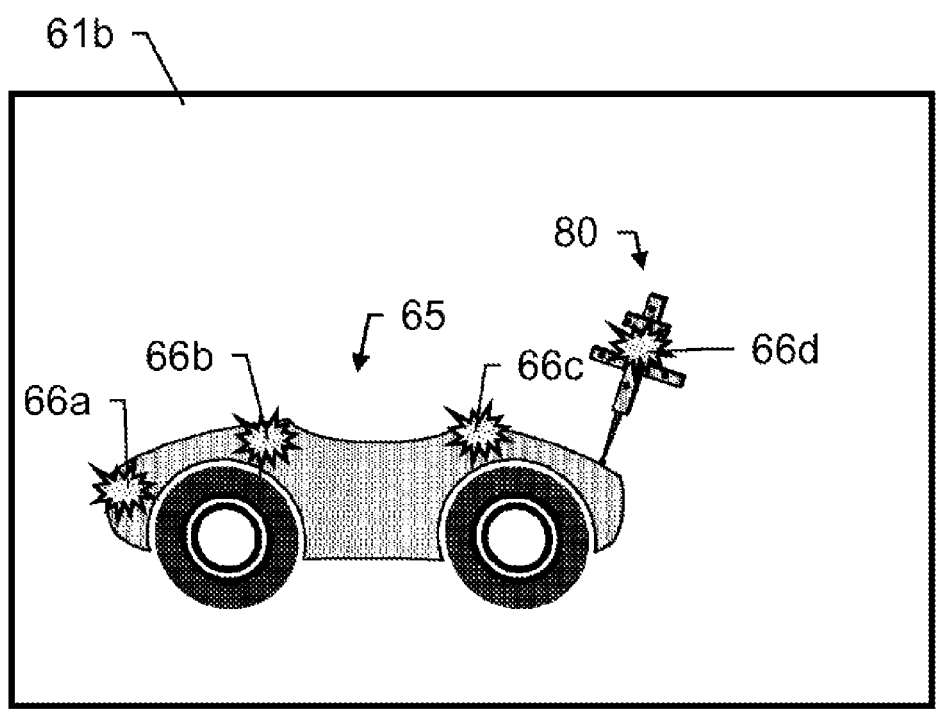

FIGS. 6a-c show overview images 61a, 61b, having search image positions 63a-d acquired using at least one target search camera and a representation of the search image positions 63a-d incorporated into the overview image 61b. An overview camera for generating the overview image 61a and the at least one target search camera are arranged in this case on a laser tracker according to the invention.

In the overview image 61a according to FIG. 6a, an object 65, for example, an automobile, is acquired, on which reflective markings 64a, 64b, 64c are applied, for example, embodied by a reflective film. In addition, a measuring aid instrument 80 having a reflector 81 is acquired. The overview image 61a can be graphically displayed on a graphic display unit on the laser tracker or a control unit for the tracker. Solely on the basis of an overview image thus acquired, the reflective markings 64a, 64b, 64c or the reflector 81, for example, at great distances, possibly cannot be identified precisely in position and the measuring laser beam of the tracker therefore cannot be aligned precisely thereon. In addition, because of the selection of at least four possible reflective targets 64a, 64b, 64c, 81, automatic alignment of the laser on the one desired target cannot be reliably executed.

FIG. 6b shows a search image 62, which is generated using the at least one target search camera of the laser tracker, having search image positions 63a-d, which have been acquired and determined by means of a position-sensitive detector of the target search camera. For this purpose, the field of vision of the target search camera is illuminated using defined illumination radiation and the reflected radiation is acquired by the target search camera, imaged on the detector, and the search image 62 having search image positions 63a-d is acquired. The search image 62 is acquired for the position-dependent identification of targets and typically does not allow—in contrast to an overview camera—acquisition of spectral images comprising the visual spectral range and/or color images.

FIG. 6c shows an overview image 61b having the acquired object 65 and the measuring aid instrument 80, wherein markings 66a-d, which indicate the search image positions 63a-d of the search image 62, are displayed in the image 61b by means of image processing and as a function of the search image positions 63a-d in the search image 62. The target provision functionality according to the invention provides in this case, in the meaning of a target display, a position-faithful transfer of the search image positions 63a-d in the form of graphic markings 66a-d into the overview image 61b. By way of this representation, one of the markings 66a-d can now be selected, for example, in particular by a user, and thus the respective target or the respective search image position 63a-d can be selected and adapted. In addition, for example, a measuring sequence can be established, in which the targets are to be targeted and surveyed. Thus, for example, firstly the target represented by the marking 66b can be measured and subsequently the targets of the markings 66a, 66c, 66d can be approached such that the measuring radiation is incident on the respective target, and can be surveyed.

a computer program product, which is stored on a machine-readable carrier, for controlling: the illumination of the target search field of vision (33b, 34b), the acquisition of the search image (62), and the acquisition of the overview image (61a, 61b), and for executing the incorporation of the graphic markings (66a-d) into the overview image (61a, 61b) as a function of the search image positions (63a-d) by means of image processing of the target provision method as claimed in claim 14 or 15, in particular when the computer program product is executed on a processing unit of a laser tracker (10, 11, 12).

It is obvious that these illustrated figures only schematically illustrate possible exemplary embodiments. The various approaches can also be combined according to the invention with one another and with methods for target identification and with measuring devices of the generic type, in particular laser trackers, of the prior art.

What is claimed is:

1. A laser tracker for progressively tracking a reflective object and for determining the position of the object, the laser tracker comprising:
    a base defining a standing axis,
    a beam deflection unit for emitting measuring radiation and for receiving at least a part of the measuring radiation reflected on the object, wherein the beam deflection unit is pivotable by a motor about the standing axis and an inclination axis relative to the base and a measuring axis is defined by an emission direction of the measuring radiation,
    a distance measuring unit for precisely determining the distance to the object by means of the measuring radiation,
    an angle measuring functionality for determining an alignment of the beam deflection unit relative to the base, a target search unit having:
  illumination means for generating electromagnetic illumination radiation and
  at least one target search camera having a position-sensitive detector,
    wherein the target search camera defines a target search field of vision,
    wherein the target search field of vision can be illuminated by means of the illumination means,
    wherein using the target search camera, a search image can be acquired for the position-dependent identification of targets and
    wherein positions of illumination radiation reflections, which are acquired in the search image and represent respective reflective targets, can be identified and determined as search image positions in the search image,
an overview camera,
  wherein an overview field of vision of the overview camera overlaps with the target search field of vision,
  wherein using the overview camera, an overview image, which at least partially reproduces the visual spectral range, can be acquired for the display for a user, and
  wherein the target search camera and the overview camera are arranged in known position and alignment relationship relative to one another, and
a processing unit, wherein the laser tracker has a target provision functionality such that, upon execution of the target provision functionality by the processing unit, graphic markings are incorporated into the overview image by means of image processing as a function of the search image positions, so that the markings represent the targets in the overview image.

2. The laser tracker as claimed in claim 1, wherein the target search camera is arranged having the optical axis thereof offset to the measuring axis.

3. The laser tracker as claimed in claim 1, wherein the illumination radiation has a defined illumination wavelength range in the infrared range, and the target search camera is implemented to acquire electromagnetic radiation in a narrowband range, around the defined illumination wavelength range.

4. The laser tracker as claimed in claim 1, wherein, as a function of the illumination radiation reflections acquired in the search image, a shape and a spatial extension of the targets can be determined and the markings can be displayed in the overview image as a function of the shape and the spatial extension.

5. The laser tracker as claimed in claim 1, wherein
  the target search camera and the overview camera have defined focal lengths that are either identical or constant, and/or
  the target search camera is arranged such that its optical axis arranged offset in parallel to the optical axis of the overview camera.

6. The laser tracker as claimed in claim 1, wherein the target search unit has one further or multiple further target search cameras having respectively a position-sensitive detector and respectively a target search field of vision, wherein the one further or multiple further target search cameras are implemented to acquire electromagnetic radiation in the range around the illumination wavelength range.

7. The laser tracker as claimed in claim 6, wherein
  the target search cameras are respectively arranged with known and fixed position and alignment relationship relative to one another and relative to the overview camera such that
  the target search fields of vision of the target search cameras overlap in a shared range of vision with the overview field of vision, and
  the optical axes thereof are respectively arranged offset to the measuring axis.

8. The laser tracker as claimed in claim 6,
  wherein, using each of the target search cameras, respectively a search image having search image positions can be acquired and respective search image positions representing a shared target can be grouped such that coarse distances to the targets can be determined as a function of the grouped search image positions, wherein:
    the coarse distances can be linked to respective items of image information of the overview image such that an at least partially perspective environmental image can be generated, and/or
    in the scope of the target provision functionality, as a function of the search image positions, the graphic markings are incorporated into the overview image and/or into the at least partially perspective environmental image, wherein the markings are incorporated as a function of the coarse distances.

9. The laser tracker as claimed in claim 1, wherein the laser tracker has one further or multiple further overview cameras for acquiring one further or multiple further overview images which at least partially reproduce the visual spectral range, wherein a perspective overview image can be generated from the overview image and the one further or the multiple further overview images, and the target provision functionality is configured such that upon execution of the target provision functionality, the graphic markings are incorporated into the perspective overview image.

10. The laser tracker as claimed in claim 1, further comprising:
  a support, which is pivotable by a motor about the standing axis relative to the base and defines the inclination axis, and
  a targeting unit, which is implemented as a beam deflection unit and is pivotable by a motor about the inclination axis relative to the support, having a telescope unit for emitting the measuring radiation and for receiving at least a part of the measuring radiation reflected on the target.

11. The laser tracker as claimed in claim 1, wherein the target provision functionality provides a position-faithful transfer of the search image positions into the overview image and the targets can be displayed in a position-faithful manner in the overview image by means of the graphic markings.

12. The laser tracker as claimed in claim 1 further comprising a control unit for controlling the laser tracker, wherein the control unit has a display unit for the graphic display of the overview image and the markings.

13. The laser tracker as claimed in claim 12, further comprising a selection function, wherein:
  in the scope of the selection function, a desired marking is selectable from the markings incorporated into the overview image by means of the display unit, and/or
  a measuring sequence of the targets represented by the markings is definable by means of the selection function.

14. The system as claimed in claim 13, wherein the targets can be targeted and surveyed in the measuring sequence successively by an alignment of the measuring radiation on the targets.

15. The system as claimed in claim 1, wherein the overview image is a color image.

16. A target provision method for incorporating graphic markings into an overview image using a laser tracker, the laser tracker comprising:
- a base defining a standing axis,
- a beam deflection unit for emitting measuring radiation and for receiving at least a part of the measuring radiation reflected on an object, wherein the beam deflection unit is pivotable by a motor about the standing axis and an inclination axis relative to the base,
- a distance measuring unit for precisely determining the distance by means of the measuring radiation, and
- an angle measuring functionality for determining an alignment of the beam deflection unit relative to the base;

the method comprising:
- illuminating a target search field of vision using electromagnetic illumination radiation,
- acquiring a search image in the target search field of vision for the position-dependent identification of targets, wherein illumination radiation reflections, which represent positions of reflective targets, are identified as search image positions in the search image, and
- acquiring the overview image, which at least partially reproduces the visual spectral range, wherein an overview field of vision is defined for the display for a user are performed, wherein:
- the overview field of vision overlaps with the target search field of vision and
- a recording of the search image and a recording of the overview image of respectively known position and in known alignment relationship are performed,
- wherein the graphic markings are incorporated into the overview image by means of image processing as a function of the search image positions, so that the markings represent the targets in the overview image.

17. The target provision method as claimed in claim 15, wherein the overview image is a color image.

18. The target provision method as claimed in claim 15, wherein:
- at least one further acquisition of a search image having further search image positions of at least one further known position and in known alignment relationship is performed,
- respective search image positions representing a shared target are grouped and coarse distances to the targets are determined as a function of the grouped search image positions, and
- in the scope of the target provision method, the markings are incorporated into the overview image as a function of the search image positions, and/or
- are incorporated as a function of the grouped search image positions.

19. The target provision method as claimed in claim 17, wherein the grouped search image positions comprise coarse distances.

20. A computer program product, which is stored on a machine-readable carrier, for controlling:
- illuminating a target search field of vision,
- acquiring a search image in the target search field of vision for the position-dependent identification of targets, wherein illumination radiation reflections, which represent positions of reflective targets, are identified as search image positions in the search image;
- acquiring an overview image, and
- incorporating of graphic markings into the overview image as a function of the search image positions.

* * * * *